(12) United States Patent
Sakurada et al.

(10) Patent No.: US 11,188,071 B2
(45) Date of Patent: Nov. 30, 2021

(54) DRIVING CONTROL SYSTEM

(71) Applicant: TOYOTA JIDOSHA KABUSHIKI KAISHA, Toyota (JP)

(72) Inventors: Shin Sakurada, Toyota (JP); Sinae Kim, Nagoya (JP); Takayuki Yano, Nisshin (JP); Naoki Yamamuro, Nagoya (JP); Takashi Hayashi, Aichi-gun (JP); Koji Miyata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/789,534

(22) Filed: Feb. 13, 2020

(65) Prior Publication Data
US 2020/0293035 A1 Sep. 17, 2020

(30) Foreign Application Priority Data
Mar. 12, 2019 (JP) .............................. JP2019-044459

(51) Int. Cl.
| G05D 1/00 | (2006.01) |
| G05D 1/02 | (2020.01) |
| H04N 5/232 | (2006.01) |
| G06K 9/00 | (2006.01) |
| G01S 13/86 | (2006.01) |

(52) U.S. Cl.
CPC ......... *G05D 1/0022* (2013.01); *G05D 1/0246* (2013.01); *G05D 1/0257* (2013.01); *G06K 9/00805* (2013.01); *G06K 9/00818* (2013.01); *H04N 5/23245* (2013.01); *G01S 13/865* (2013.01)

(58) Field of Classification Search
CPC .. G05D 1/0022; G05D 1/0246; G05D 1/0257; G06K 9/00805; G06K 9/00818; H04N 5/23245; G01S 13/865
See application file for complete search history.

(56) References Cited

U.S. PATENT DOCUMENTS

| 2015/0235484 A1* | 8/2015 | Kraeling | G07C 5/0866 |
| | | | 701/1 |
| 2018/0354505 A1* | 12/2018 | Meier | B60W 30/0956 |
| 2020/0293768 A1* | 9/2020 | Ogura | G06K 9/00228 |
| 2021/0097267 A1* | 4/2021 | Stokman | G06K 9/00355 |
| 2021/0097438 A1* | 4/2021 | Matsumoto | G06N 20/00 |

FOREIGN PATENT DOCUMENTS

JP 2009-204570 A 9/2009

* cited by examiner

*Primary Examiner* — Peter D Nolan
*Assistant Examiner* — Mikko Okechukwu Obioha
(74) *Attorney, Agent, or Firm* — Oliff PLC

(57) ABSTRACT

A driving control system in which a server apparatus controls an operation of a vehicle via a telecommunication network. The server apparatus includes a controller configured to determine whether a condition for raising a degree of accuracy in detecting a wild animal in an area around the vehicle is satisfied, and to raise the degree of accuracy in detecting the wild animal by controlling a detection device included in the vehicle at a timing when the condition is satisfied.

4 Claims, 4 Drawing Sheets

DRIVING CONTROL SYSTEM

CROSS-REFERENCE TO RELATED APPLICATION

This application claims priority to Japanese Patent Application No. 2019-044459 filed on Mar. 12, 2019 incorporated herein by reference in its entirety.

BACKGROUND

1. Technical Field

The present disclosure relates to a driving control system in which a server apparatus controls the operation of a vehicle via a telecommunication network.

2. Description of Related Art

Japanese Unexamined Patent Application Publication No. 2009-204570 (JP 2009-204570 A) describes a navigation system. When the position of a host vehicle enters a wild animal distributional area retrieved from a center server, the navigation system of JP 2009-204570 A provides guidance according to the kinds of wild animals living in the wild animal distributional area. In addition, when a wild animal is recognized, the information regarding the recognized wild animal is transmitted to the center server.

SUMMARY

In the navigation system described in JP 2009-204570 A, in order to avoid contact of the vehicle with wild animals, the degree of accuracy in detecting wild animals may be always kept high by causing the vehicle to acquire a large amount of information from its surroundings. In this case, the amount of information transmitted to the center server may be too large, resulting in congestion of communication traffic between the vehicle and the center server.

The present disclosure provides a driving control system configured to detect wild animals to avoid contact of a vehicle with the wild animals without causing congestion of communication traffic.

A driving control system according to the present disclosure is a driving control system in which a server apparatus controls an operation of a vehicle via a telecommunication network. The server apparatus includes a controller configured to determine whether a condition for raising a degree of accuracy in detecting a wild animal in an area around the vehicle is satisfied, and to raise the degree of accuracy in detecting the wild animal by controlling a detection device included in the vehicle at a timing when the condition is satisfied.

The controller may be configured to raise the degree of accuracy in detecting the wild animal when a current time falls within time of day in which the wild animal is likely to appear.

The controller may be configured to raise the degree of accuracy in detecting the wild animal when a caution sign for the wild animal is detected near the vehicle.

The controller may be configured to raise the degree of accuracy in detecting the wild animal by increasing a resolution of an image-capturing device configured to capture an image of surroundings of the vehicle.

With the driving control system according to the present disclosure, the degree of accuracy in detecting a wild animal is raised when a condition for raising the degree of accuracy in detecting the wild animal in an area around a vehicle is satisfied. Thus, it is possible to detect the wild animal to avoid contact of the vehicle with the wild animal, without causing congestion of communication traffic.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, the configuration and operations of a driving control system according to an embodiment of the present disclosure will be described with reference to the accompanying drawings.

Overall Configuration

Figure 1:
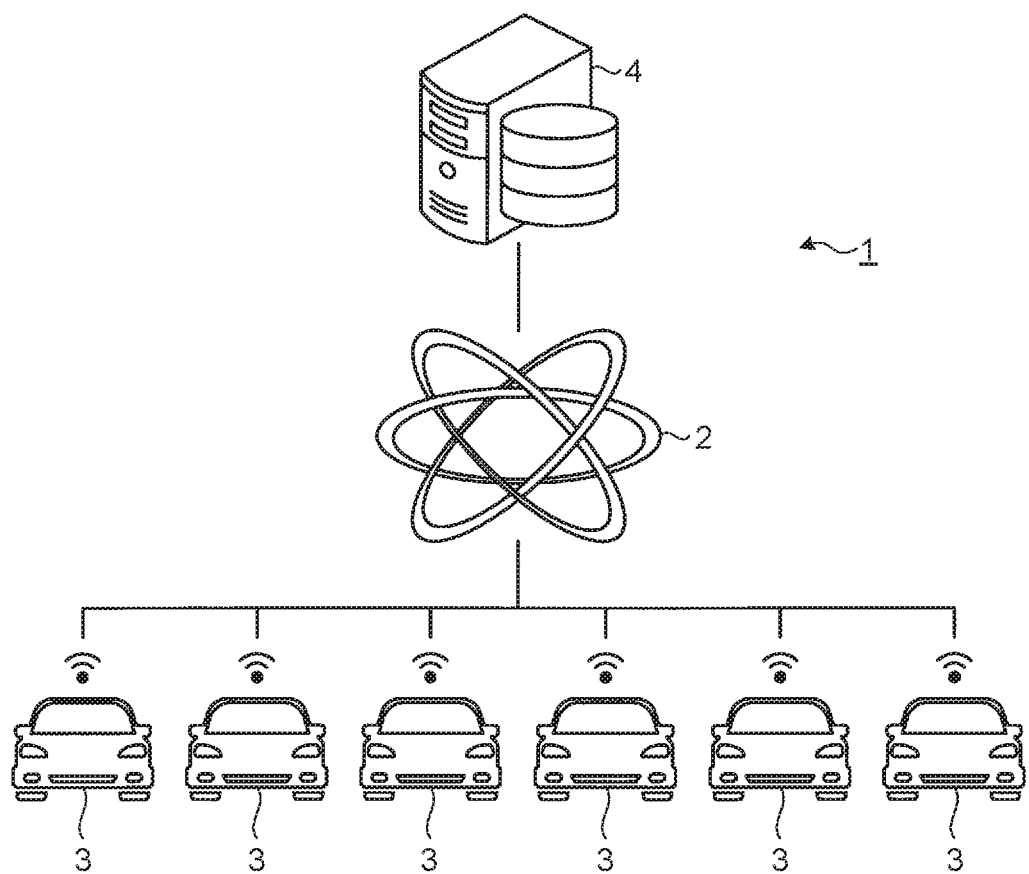
FIG. 1 is a schematic diagram illustrating the configuration of a driving control system according to an embodiment of the present disclosure.

First, the overall configuration of the driving control system according to the embodiment of the present disclosure will be described with reference to FIG. 1, FIG. 1 is a schematic diagram illustrating the configuration of the driving control system according to the embodiment of the present disclosure. As illustrated in FIG. 1, the driving control system 1 according to the embodiment of the present disclosure includes a plurality of vehicles 3 and a server apparatus 4 that can communicate with each other over a telecommunication network 2, such as the Internet or a cellular network. Configuration of Vehicle Next, the configuration of each vehicle 3 will be described with reference to FIG. 2.

Figure 2:
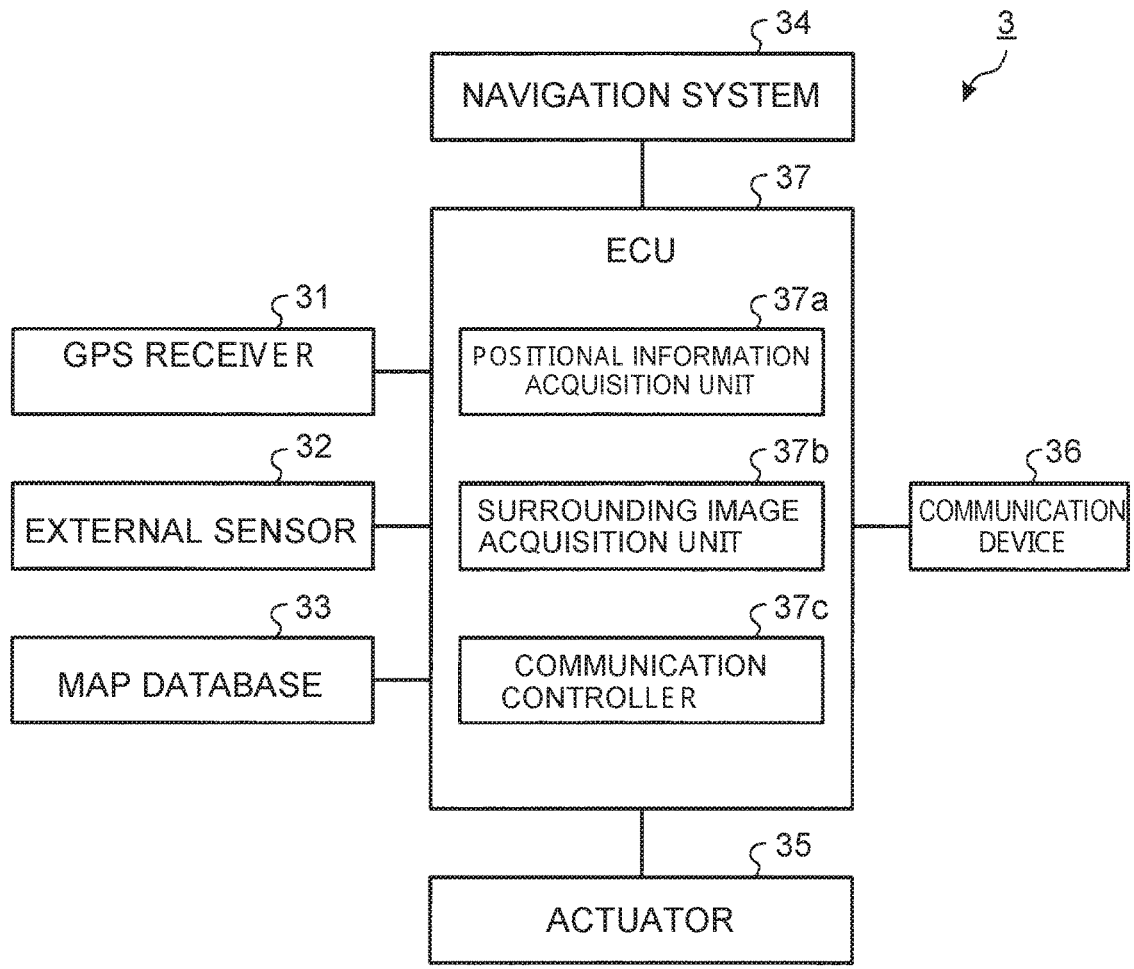
FIG. 2 is a block diagram illustrating the configuration of each vehicle in FIG. 1.

FIG. 2 is a block diagram illustrating the configuration of each vehicle 3 in FIG. 1, As illustrated in FIG. 2, the vehicle 3 includes a global positioning system receiver 31 (hereinafter, referred to as "GPS receiver 31"), an external sensor 32, a map database 33, a navigation system 34, an actuator 35, a communication device 36, and an electronic control unit 37 (hereinafter, referred to as "ECU 37").

The GPS receiver 31 functions as a position-measuring device that measures the position of the vehicle 3, The GPS receiver 31 measures the position (e.g., the latitude and longitude) of the vehicle 3 by receiving signals from three or more GPS satellites. The GPS receiver 31 outputs information regarding the measured position of the vehicle 3 to the ECU 37. The vehicle 3 may be configured to measure the position of the vehicle 3 through Simultaneous Localization and Mapping (SLAM) technology, based on the information regarding the positions of stationary obstacles, such as utility poles, included in the map information stored in the map database 33, and results of detection by the external sensor 32.

The external sensor 32 includes image-capturing devices, a radar, and a lidar. The image-capturing devices are configured to capture images of external circumstances surrounding the vehicle 3. The image-capturing devices are provided respectively on the back side of a windshield of the vehicle 3 and on the rear face of the vehicle 3, The image-capturing devices may be provided respectively on the right and left side faces of the vehicle 3. The image-capturing devices output, to the ECU 37, image information obtained by capturing an image of the external circumstance forward of the vehicle 3 and an image of the external circumstance rearward of the vehicle 3. Each image-capturing device may be a monocular camera or a stereoscopic camera. A stereoscopic camera includes two image-capturing units arranged so as to reproduce binocular parallax. The image information obtained by a stereoscopic camera also includes information in the depth direction.

The radar detects an obstacle near the vehicle 3 by using a radio wave (e.g., millimeter wave). The radar transmits a radio wave to the surroundings of the vehicle 3 and receives the radio wave reflected by obstacle, thereby detecting the obstacle. The radar outputs the information regarding the detected obstacle to the ECU 37. Examples of obstacles include dynamic obstacles, such as bicycles and other vehicles, in addition to the stationary obstacles described above. The lidar detects an obstacle near the vehicle 3 by using light. The lidar transmits light to the surroundings of the vehicle 3 and receives the light reflected by an obstacle to measure a distance from the vehicle 3 to a point of reflection, thereby detecting the obstacle. The lidar outputs information regarding the detected obstacle to the ECU 37. Note that it is not always necessary to include both the lidar and the radar.

The map database 33 is a database in which map information is stored. The map database 33 is provided in a storage device, such as a hard disk drive (HDD) mounted in the vehicle 3, The map database 33 can be connected to the server apparatus 4 through wireless communication via the communication device 36. The map database 33 periodically updates the map information based on the latest map information stored in the server apparatus 4. The map information includes information regarding the locations of roads (information regarding the location of each lane), information regarding the shapes of roads (curves, the kinds of straight sections, the curvatures of curves, and so forth), information regarding the widths of roads (information regarding the width of each lane), information regarding the speed limits on roads, and image information regarding roads and their surroundings (three-dimensional information). Further, the map information includes information regarding the locations of intersections and road forks, information regarding the locations of stop lines, information regarding the locations of crosswalks, and information regarding the locations of traffic lights. The map information may also include information regarding the gradients of roads and information regarding the cants of roads. The map information may further include information regarding the locations and shapes of stationary obstacles, such as curbs, utility poles, poles, guardrails, walls, and buildings. The map information may also include information regarding the locations and shapes of road marking paints, such as characters and marks painted on road surfaces. The road marking paints may include manholes. The map information may also include information regarding signboards provided above roads and information regarding signs provided on roadsides.

The navigation system 34 computes a target route from the current position of the vehicle 3 to a destination, by a known method, based on the destination set in advance, the position of the vehicle 3 measured by the OPS receiver 31, and the map information stored in the map database 33. Then, the navigation system provides route guidance for enabling the vehicle 3 to travel along the target route. The destination is set when an occupant of the vehicle 3 operates an input button (or a touch panel) included in the navigation system 34.

The actuator 35 is an apparatus configured to control driving of the vehicle 3. The actuator 35 includes a throttle actuator, a brake actuator, and a steering actuator. The throttle actuator controls the amount of air to be supplied to an engine (a throttle valve opening degree) in response to a control signal from the ECU 37, thereby controlling a driving force of the vehicle 3. When the vehicle 3 is a hybrid vehicle, the driving force is controlled in response to a control signal transmitted from the ECU 37 to a motor serving as a power source, in addition to a control signal indicating the amount of air to be supplied to the engine. When the vehicle 3 is an electric vehicle, the driving force is controlled in response to a control signal transmitted from the ECU 37 to a motor serving as a power source. The motor serving as a power source in such cases is included in the actuator 35. The brake actuator controls a braking system in response to a control signal from the ECU 37, thereby controlling braking forces to be applied to wheels of the vehicle 3. The steering actuator controls driving of an assist motor included in an electric power steering system and configured to control steering torque, in response to a control signal from the ECU 37, The communication device 36 includes a wireless communication circuit and so forth for performing wireless communication. The communication device 36 performs information communication with the server apparatus 4 via the telecommunication network 2, The communication device 36 may perform vehicle-to-vehicle communication with other vehicles capable of performing vehicle-to-vehicle communication. The communication device 36 may perform road-to-vehicle communication with roadside transceivers provided along roads.

The ECU 37 is an electronic control unit including a central processing unit (CPU), a read-only memory, (ROM), a random-access memory (RAM), a controller area network (CAN) communication circuit, and so forth. In the present embodiment, the ICU 37 functions as a positional information acquisition unit 37a, a surrounding image acquisition unit 37b, and a communication controller 37c, by loading computer programs stored in the ROM into the RAM and executing the computer programs loaded into the RAM by using the CPU.

The positional information acquisition unit 37a acquires information regarding the position of the vehicle 3 by using the UPS receiver 31, The surrounding image acquisition unit 37h acquires image information regarding the surroundings of the vehicle 3 by using the external sensor 32. The communication controller 37c controls the information communication with the server apparatus 4 via the telecommunication network Configuration of Server Apparatus Next, the configuration of the server apparatus 4 will be described with reference to FIG. 3.

Figure 3:
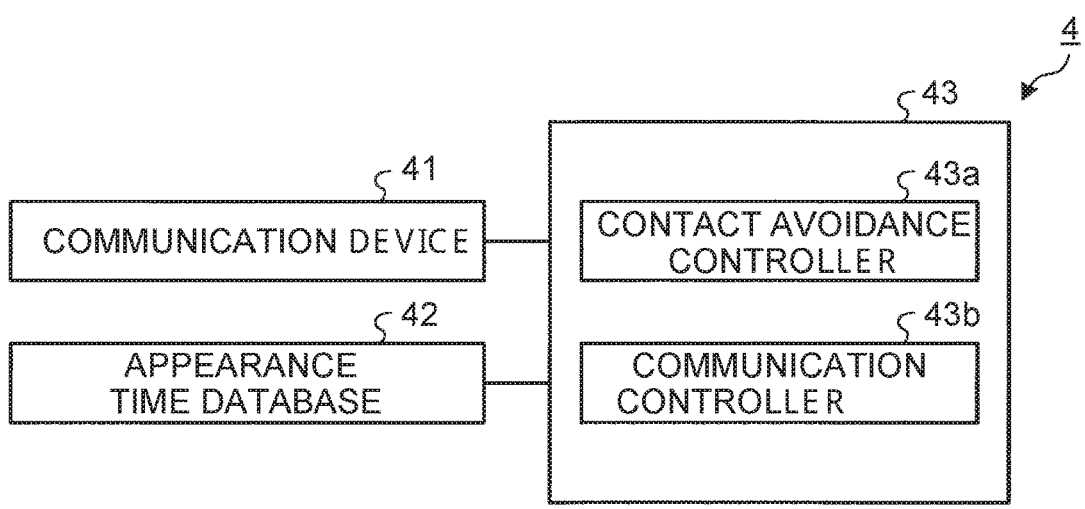
FIG. 3 is a block diagram illustrating the configuration of a server apparatus in FIG. 1.

FIG. 3 is a block diagram illustrating the configuration of the server apparatus 4 in FIG. 1, As illustrated in FIG. 3, the server apparatus 4 includes a communication device 41, an appearance time database 42, and a server body 43.

The communication device 41 includes a wireless communication circuit and so forth for performing wireless communication. The communication device 41 performs information communication with each vehicle 3 via the telecommunication network 2.

The appearance time database 42 stores, for each kind of wild animals, information regarding an area, time of day, and time of year in which wild animals of the kind appear.

The server body 43 includes a known information processor. The server body 43 functions as a contact avoidance controller 43a and a communication controller 43b when an internal processor executes computer programs.

The driving control system 1 having the foregoing configuration executes contact avoidance control processing described below, thereby restraining the vehicle 3 from coming into contact with wild animals, without causing congestion of communication. traffic. Hereinafter, the operation of the driving control system 1 during execution of the contact avoidance control processing will be described with reference to a flowchart illustrated in FIG. 4.

Contact Avoidance Control Processing

Figure 4:
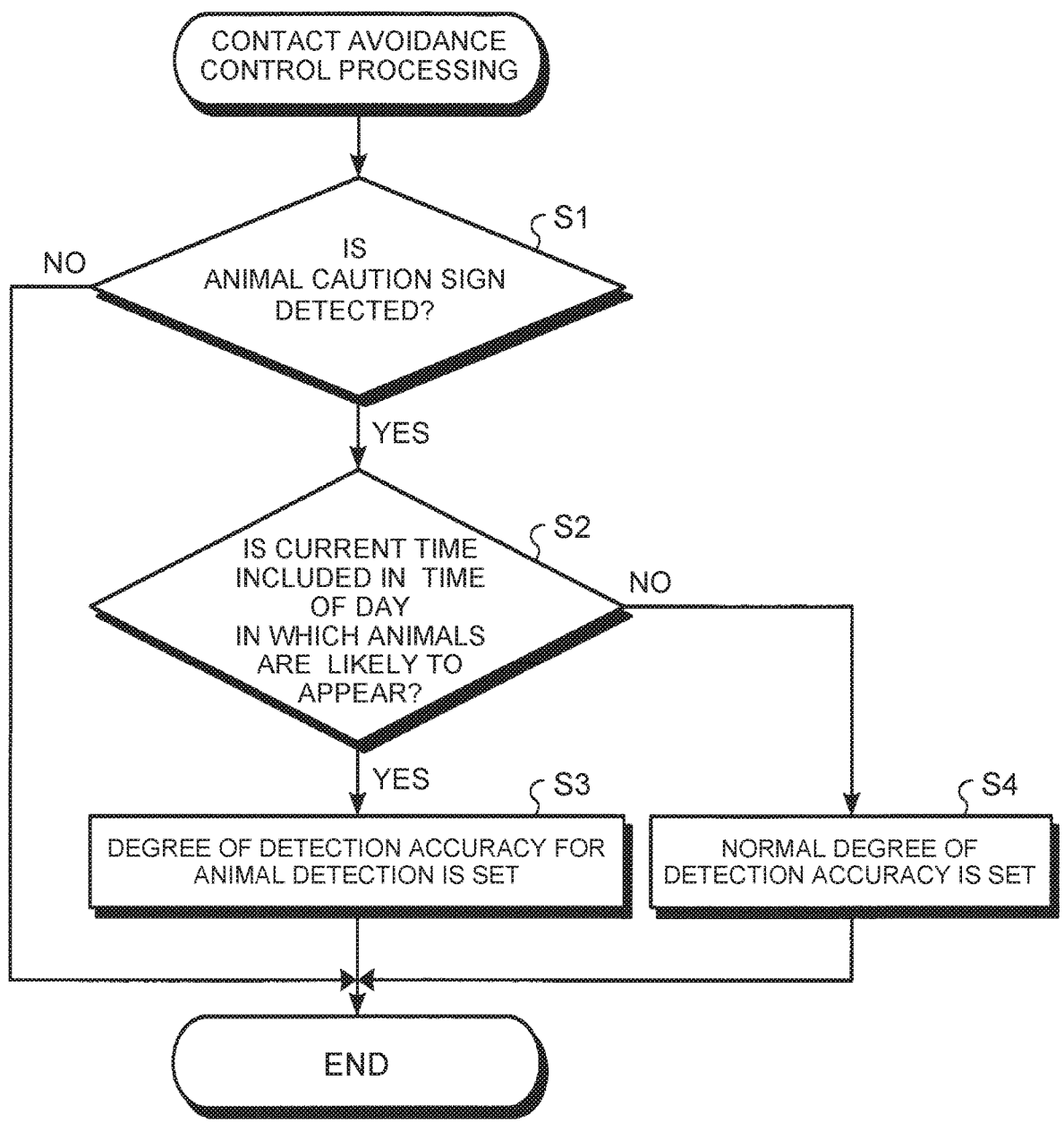
FIG. 4 is a flowchart illustrating the flow of contact avoidance control processing according to the embodiment of the present disclosure.

FIG. 4 is a flowchart illustrating a flow of the contact avoidance control processing according to the embodiment of the present disclosure. In the flowchart illustrated in FIG. 4, the contact avoidance control processing is started at a timing when an ignition switch of the vehicle 3 is switched from an off-state to an on-state, and then proceeds to processing in step S1. While the ignition switch of the vehicle 3 is in the on-state, the contact avoidance control processing is repeatedly executed each time a predetermined time period has passed after the immediately preceding contact avoidance control processing ends.

Figure 5:
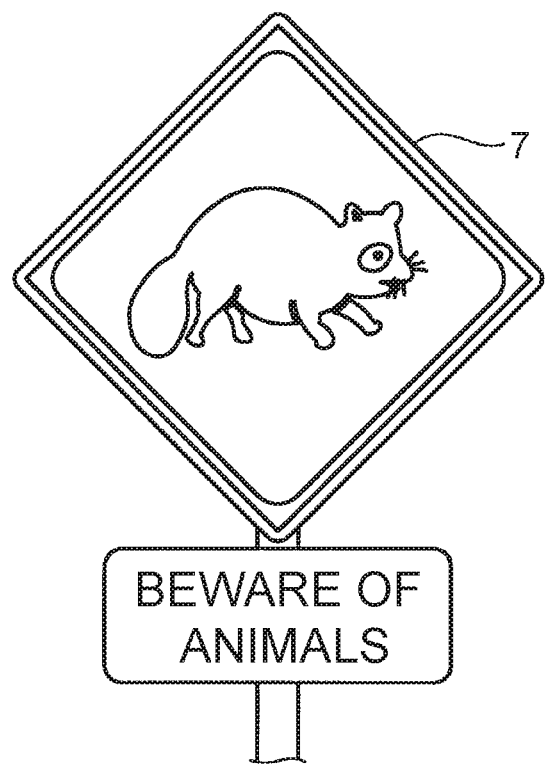
FIG. 5 illustrates an example of an animal caution sign.

In the processing in step S1, the surrounding image acquisition unit 37b acquires an image of surroundings of the vehicle 3 by using the external sensor 32, and analyzes the acquired image of the surroundings by a known image processing method, thereby determining whether, for example, an animal caution sign 7 as illustrated in FIG. 5 is detected near the vehicle 3. When the surrounding image acquisition unit 37b determines that the animal caution sign 7 is detected (step S1: Yes), the surrounding image acquisition unit 37b causes the contact avoidance control processing to proceed to processing in step S2. On the other hand, when the surrounding image acquisition unit 37b determines that the animal caution sign 7 is not detected (step S1: No), the surrounding image acquisition unit 37b ends the present contact avoidance control processing.

In the processing in step S2, first, the positional information acquisition unit 37a acquires information regarding a position of the vehicle 3 by using the GPS receiver 31, and transmits the acquired information regarding the position of the vehicle 3, along with information regarding a current time and information regarding the animal caution sign 7, to the server apparatus 4 via the telecommunication network 2. Next, the contact avoidance controller 43a identifies the kind of wild animals that are likely to appear, based on the information regarding the animal caution sign 7. Then, the contact avoidance controller 43a identifies time of day in which wild animals of the kind are likely to appear in an area around the position of the vehicle 3 with reference to the appearance time database 42, When the kind of wild animals that are likely to appear cannot be identified based on the animal caution sign 7, the contact avoidance controller 43a may identify the kind of wild animals that are likely to appear in an area around the position of the vehicle 3 at the current time, with reference to the appearance time database 42.

The contact avoidance controller 43a then determines whether the current time is included in the identified time of day, thereby determining whether the current time falls within the time of day in which wild animals of the kind are likely to appear. When the contact avoidance controller 43a determines that the current time is included in the time of day in which wild animals of the kind are likely to appear (step S2: Yes), the contact avoidance controller 43a causes the contact avoidance control processing to proceed to processing in step S3. On the other hand, when the contact avoidance controller 43a determines that the current time is not included in the time of day in which wild animals of the kind are likely to appear (step S2: No), the contact avoidance controller 43a causes the contact avoidance control processing to proceed to processing in step S4.

In the processing in step S3, the contact avoidance controller 43a controls the vehicle 3 via the telecommunication network 2, thereby setting the degree of detection accuracy for the external sensor 32 to a degree of detection accuracy for animal detection that is higher than a normal degree of detection accuracy set in advance. More specifically, when the external sensor 32 is an image-capturing device, the contact avoidance controller 43a sets the resolution of a captured image at a higher resolution than the normal resolution. After this, detection of wild animals is performed by using the external sensor 32. When a wild animal is detected, the actuator 35 is controlled so as to avoid contact of the vehicle 3 with the wild animal. Thus, the processing in step S3 ends, and the present contact avoidance control processing ends.

In the processing in step S4, the contact avoidance controller 43a controls the vehicle 3 via the telecommunication network 2, thereby setting the degree of detection accuracy for the external sensor 32 to the normal degree of detection accuracy set in advance. Thus, the processing in step S4 ends, and the present contact avoidance control processing ends.

As is apparent from the above description, in the contact avoidance control processing according to the embodiment of the present disclosure, the server apparatus 4 raises the degree of accuracy in detecting wild animals when a predetermined condition for raising the degree of accuracy in detecting wild animals is satisfied. An example of the predetermined condition includes a condition that the current time is included in time of day in which wild animals are likely to appear. Consequently, it is possible to detect a wild animal to avoid contact of the vehicle 3 with the wild animal, without causing congestion of communication traffic between the vehicle 3 and the server apparatus 4.

While the example embodiment of the present disclosure made by the inventors has been described, an applicable embodiment of the present disclosure is not limited by the description and the drawings according to the embodiment. In other words, other embodiments, examples, and operation techniques that can be achieved by those skilled in the art and the like based on the foregoing embodiment fall within the scope of the present disclosure.

What is claimed is:

1. A driving control system in which a server apparatus controls an operation of a vehicle via a telecommunication network, wherein the server apparatus includes a controller configured to:
    determine whether a condition for raising a degree of accuracy in detecting a wild animal in an area around the vehicle is satisfied, and
    in response to the condition being satisfied, control a detection device included in the vehicle to raise the degree of accuracy of the detection device in detecting the wild animal.

2. The driving control system according to claim 1, wherein the controller is configured to raise the degree of accuracy of the detection device in detecting the wild animal when a current time falls within time of day in which the wild animal is likely to appear.

3. The driving control system according to claim 1, wherein the controller is configured to raise the degree of accuracy of the detection device in detecting the wild animal when a caution sign for the wild animal is detected near the vehicle.

4. The driving control system according to claim 1, wherein
the detection device is an image-capturing device configured to capture an image of surroundings of the vehicle, and
the controller is configured to raise the degree of accuracy of the detection device in detecting the wild animal by increasing a resolution of the image-capturing device.

* * * * *